(12) United States Patent
Awan et al.

(10) Patent No.: US 10,858,001 B2
(45) Date of Patent: Dec. 8, 2020

(54) SYSTEM AND METHOD FOR CONTROLLING A VEHICLE STEERING SYSTEM

(71) Applicant: Ford Global Technologies, LLC, Dearborn, MI (US)

(72) Inventors: Muhammad Adeel Awan, Herzogenrath (DE); Frank Peter Engels, Solingen (DE); Mohsen Lakehal-ayat, Mountain View, CA (US); Uwe Hoffmann, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 15/499,306

(22) Filed: Apr. 27, 2017

(65) Prior Publication Data
US 2017/0313310 A1 Nov. 2, 2017

(30) Foreign Application Priority Data
Apr. 29, 2016 (DE) .................. 10 2016 207 436

(51) Int. Cl.
*B60W 30/12* (2020.01)
*B62D 6/00* (2006.01)
(Continued)

(52) U.S. Cl.
CPC ............ *B60W 30/12* (2013.01); *B60W 50/14* (2013.01); *B62D 5/0409* (2013.01);
(Continued)

(58) Field of Classification Search
CPC .. B60W 30/12; B60W 50/14; B60W 2420/42; B60W 2050/143;
(Continued)

(56) References Cited

U.S. PATENT DOCUMENTS 5,513,108 A 4/1996 Kishimoto et al.
5,908,457 A * 6/1999 Higashira .............. B62D 6/008
180/402
(Continued)

FOREIGN PATENT DOCUMENTS

CN 202358095 U 8/2012
CN 104742830 A 7/2015
JP H04300781 A 10/1992

OTHER PUBLICATIONS

Mohamad Taib et al, "Steering Control Method Based on TSL401 Linear Sensor Array," ARPN Journal of Engineering and Applied Sciences, vol. 10, No. 1, Jan. 2015.
(Continued)

*Primary Examiner* — Tuan C To
(74) *Attorney, Agent, or Firm* — Raymond L. Coppiellie; Burgess Law Office, PLLC

(57) ABSTRACT

A system for control of a steering system of a vehicle, mechanically coupled to the wheels and including an actuator for applying a force or a torque to the steering system. A force or torque can be superimposed on a force or torque originating from the wheels. The system includes a detection unit disposed on the vehicle and configured for anticipatorily detecting at least one surface condition of a surface section located ahead of the vehicle in the direction of vehicle travel and subsequently driven on by the vehicle. The system including a data processing unit disposed on the vehicle and connected to and communicating with the detection unit. The data processing unit configured for generating control signals for controlling an actuator of the steering system based on the detected surface condition.

17 Claims, 4 Drawing Sheets

(51) Int. Cl.
*B60W 50/14* (2020.01)
*B62D 5/04* (2006.01)

(52) U.S. Cl.
CPC ........... *B62D 5/0463* (2013.01); *B62D 6/007* (2013.01); *B62D 6/008* (2013.01); *B60W 2050/143* (2013.01); *B60W 2420/42* (2013.01); *B60W 2420/52* (2013.01); *B60W 2510/202* (2013.01); *B60W 2552/40* (2020.02); *B60W 2710/202* (2013.01)

(58) Field of Classification Search
CPC ....... B60W 2420/52; B60W 2550/148; B60W 2710/202; B60W 2510/202
USPC .......................................................... 701/42
See application file for complete search history.

(56) References Cited

U.S. PATENT DOCUMENTS

| | | | |
|---|---|---|---|
| 6,178,365 B1 | 1/2001 | Kawagoe et al. | |
| 7,508,148 B2* | 3/2009 | Kanda | B62D 6/008 |
| | | | 180/402 |
| 7,872,764 B2 | 1/2011 | Higgins et al. | |
| 8,272,474 B2* | 9/2012 | Mori | B62D 5/0469 |
| | | | 180/446 |
| 8,332,134 B2 | 12/2012 | Zhang et al. | |
| 8,406,956 B2* | 3/2013 | Wey | B62D 6/00 |
| | | | 701/41 |
| 8,676,508 B2 | 3/2014 | Schwarz | |
| 8,917,904 B2 | 12/2014 | Zhang et al. | |
| 9,340,227 B2* | 5/2016 | Bajpai | B60W 30/12 |
| 2001/0011201 A1* | 8/2001 | Nishizaki | B62D 5/006 |
| | | | 701/41 |
| 2002/0063543 A1* | 5/2002 | Kanda | B62D 5/0463 |
| | | | 318/433 |
| 2002/0129988 A1* | 9/2002 | Stout | B62D 6/008 |
| | | | 180/400 |
| 2004/0199315 A1* | 10/2004 | Altemare, Jr. | B62D 5/0457 |
| | | | 701/41 |
| 2008/0015743 A1 | 1/2008 | Haug | |
| 2014/0118552 A1 | 5/2014 | Takahama et al. | |
| 2014/0136015 A1 | 5/2014 | Kayakawa et al. | |
| 2015/0224995 A1* | 8/2015 | Yamaoka | B60W 10/04 |
| | | | 702/141 |
| 2015/0371095 A1* | 12/2015 | Hartmann | G06K 9/00791 |
| | | | 348/148 |

OTHER PUBLICATIONS

Communication from China National Intellectual Property Administration, Application No. 2017102862675, dated Sep. 3, 2020.

* cited by examiner

SYSTEM AND METHOD FOR CONTROLLING A VEHICLE STEERING SYSTEM

CROSS-REFERENCE TO RELATED APPLICATIONS

Not Applicable.

BACKGROUND OF THE INVENTION

1. Field of the Invention

The invention relates to a system and method for controlling a vehicle steering system.

2. Description of Related Art

Many modern motor vehicles have a steering wheel mechanically coupled to steerable front wheels of the vehicle. When a vehicle travels over a rough or uneven surface of a roadway, or over an object on a roadway, forces acting on the front wheels due to surface deviations of the underlying surface are transferred to the steering wheel. The driver receives, via the response transmitted to the steering wheel, direct feedback regarding the surface condition of the underlying surface or roadway. Direct feedback also occurs with an EPAS steering system (Electric Power Assisted Steering). Many drivers consider this direct feedback useful.

SUMMARY OF THE INVENTION

A vehicle steering system having an actuator applying a force to the steering system. The system includes a detection unit obtaining a surface condition of a surface section located ahead of a vehicle in a direction of vehicle travel and subsequently driven on by the vehicle. Additionally, a data processing unit is connected to and communicates with the detection unit, wherein the data processing unit generates a control signal that controls the actuator based on the detected surface condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
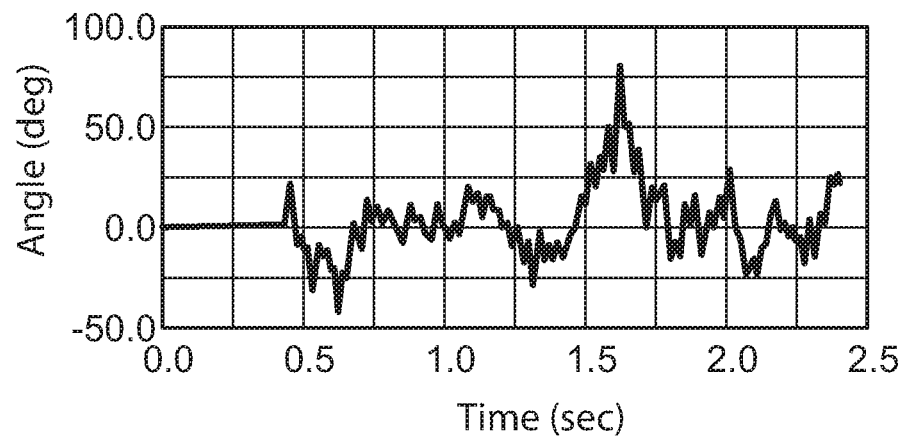
FIG. 1 is a diagram of steering wheel movement during travel over cobblestones with a conventional EPAS steering system.

FIG. 1 illustrates a steering wheel movement diagram, of a non-illustrated steering wheel, having a conventional EPAS steering system traveling over cobblestones. The steering angle (y-axis) is plotted over time (x-axis). The illustrated movements of the steering wheel are generated by load forces acting on the steerable wheels of the vehicle, in the disclosed example the steerable front wheels. In exemplary embodiment of the steering system 1, because the steerable front wheels are mechanically coupled to the steering wheel via a steering tie rod and a steering column of the steering system, load forces acting on the steerable wheels are mechanically transferred to the steering wheel via the steering tie rod and the steering column.

Figure 2:
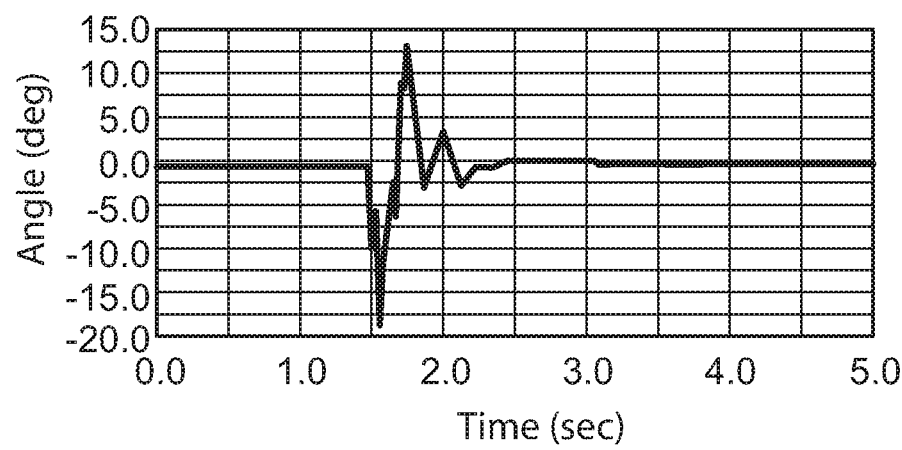
FIG. 2 is a diagram of steering wheel movement during travel over a road bump with a conventional EPAS steering system.

FIG. 2 illustrates a steering wheel movement diagram illustrating steering wheel movement of a vehicle having a conventional EPAS steering system traveling over a single road bump. The steering angle (y-axis) is plotted over time (x-axis). Because the load forces acting on the steerable front wheels are mechanically transferred to the steering wheel via a steering tie rod in the steering column of the steering system they cause the illustrated movements of the steering wheel.

Figure 3:
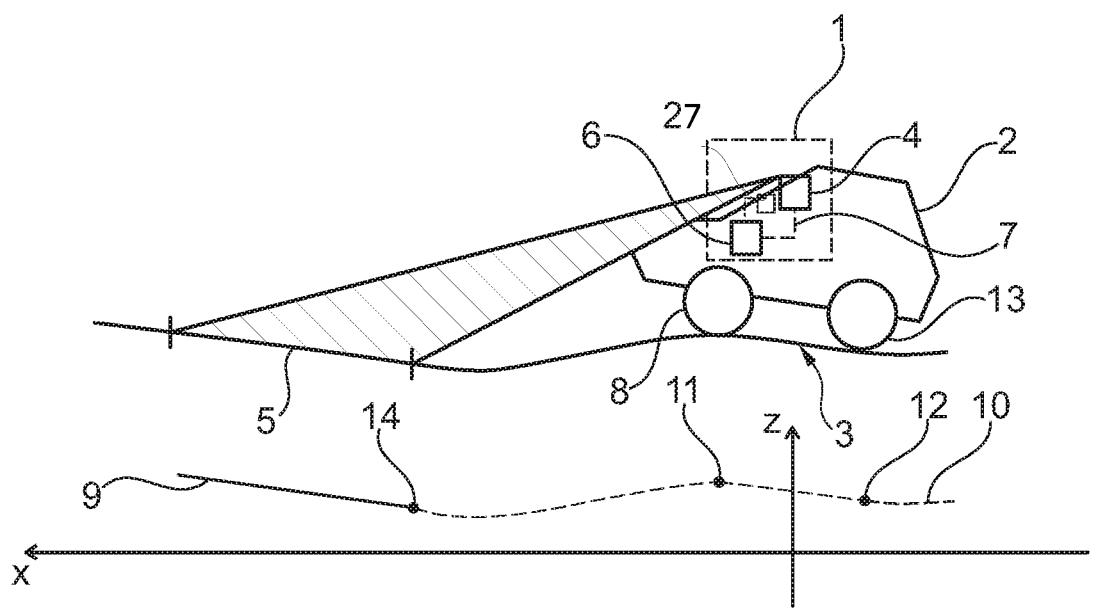
FIG. 3 it is a schematic representation of one exemplary embodiment of a system according to the invention.

FIG. 3 is a schematic representation of one exemplary embodiment of a system 1 of the invention for controlling or regulating an EPAS steering system of a vehicle 2 driving on an underlying surface 3.

In the present exemplary embodiment, the EPAS steering system of the vehicle 2 is mechanically coupled to the front wheels 8 and includes at least one actuator 25 that applies a force or a torque to the steering system. The force or torque applied by the actuator 25 can be superimposed on a force or torque originating from the wheels.

The system 1 includes a detection unit 4 positioned on the vehicle 2 and configured for anticipatorily detecting at least one surface condition of a surface section 5 of the underlying surface located ahead of the vehicle 2, in the direction of vehicle travel subsequently driven on by the vehicle 2.

The system 1 also includes a data processing unit 6 associated with the vehicle 2. The data processing unit 6 connects to and communicates with the detection unit 4. The data processing unit 6 receiving, via a communication connection 7, signals generated by the detection unit 4, and generating, based on the surface condition, control signals for controlling an actuator of the EPAS steering system.

The system 1 also includes a human-machine interface unit 27 disposed on the vehicle 2 and connected to the data processing unit 6 enabling adjustment of at least one property of the control of the actuator.

The data processing unit 6 can be configured to control the actuator such that feedback forces acting on a steering wheel of the EPAS steering system can be damped. The data processing unit 6 can also be configured to generate a warning signal based on the detected surface condition. The data processing unit 6 can be configured to determine a lane of the surface section 5 for the vehicle 2 based on the surface condition, and to control the actuator 25 based on for the detected surface condition, such that the actuator 25 generates steering-assisting forces for staying in the lane. The data processing unit 6 can be further configured to determine local coefficients of friction of the surface section 5 based on the detected surface condition, and control the actuator depending on the coefficients of friction.

The detection unit 4 includes at least one non-illustrated mono-camera or stereo-camera. The data processing unit 6 creates an image file having depth information based on the image files of the particular camera.

The data processing unit 6 also creates a height profile 10 of the surface section 5 for a defined path of the front wheels 8 of the vehicle 2 based on the image file having depth information.

The data processing unit 6 may also generate a warning signal when a local height gradient of the height profile exceeds a predefined limit value.

FIG. 3 shows, below the underlying surface 3, a progression 9, shown as a solid line, instantaneously detected by the cameras, of the underlying surface section 5 of the underlying surface 3 located ahead of the vehicle 2 in the direction of vehicle travel and subsequently driven on by the vehicle 2. Also shown is a height profile, dashed line 10, determined with the aid of the data processing unit 6 based on the previously generated image files from the cameras, of part underlying surface 3, previously detected by the cameras. The resultant height profile 10 corresponds to the actual height profile of the underlying surface 3. The height profile 10 also shows a front wheel 8 load input 11 based on the height profile 10, and a rear wheel 13 load input 12 based on the height profile 10. Estimating the load input or force acting on the wheels 8, 13 by the data processing unit 6 based on the position of the wheel load inputs 11 and 12, respectively, permits generation of corresponding control signals or feedback forces. The detected progression 9 transitions into the determined height profile 10 at the point 14. Indicated underneath the progression 9 and the height profile 10 in FIG. 3 is a spatial coordinate system, wherein the distance, for example, of the detected progression 9 or the surface section 5 from components, in particular the front wheels 8 of the vehicle 2 is shown on the x-axis x, which is parallel to the vehicle longitudinal axis. The z-axis z corresponds to the vertical axis of the vehicle 2.

Figure 4:
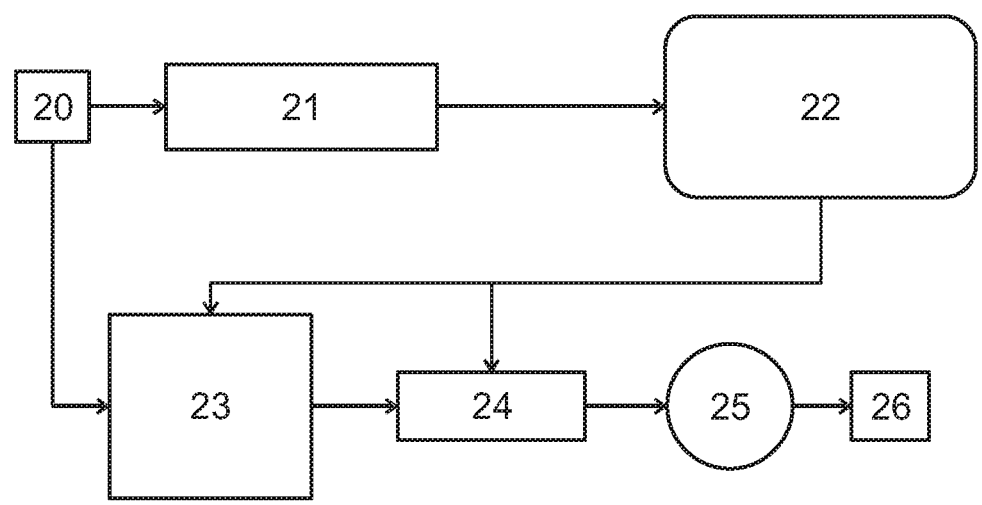
FIG. 4 schematically illustrates an information flow structure taking place in a system according to an exemplary embodiment of the invention.

FIG. 4 schematically illustrates an information flow structure taking place in a system according to an exemplary embodiment of the invention for controlling or regulating an EPAS steering system of a vehicle. The system may be similar to the system shown in FIG. 3.

The anticipatorily detected surface condition 20 of the surface section, subsequently driven on by the vehicle, acts via a varying time delay 21 on instantaneous driving-state parameters 22 of the traveling vehicle, detected by various vehicle sensors. The detected surface condition 20 and the instantaneous driving-state parameters 22 are fed to a calculator 23 that calculates a steering torque, for application to a steering column 26 of the EPAS steering system, rotationally fixed to the steering wheel, to generate a steering response for the driver, which is realistic, although for example damped. The calculated steering torque is fed, with the driving-state parameters 22, to a controller 24. The controller 24 generates, considering the calculated steering torque and the driving-state parameters 22, control signals for controlling an actuator 25 of the EPAS steering system that acts through the steering column 26 on the steering wheel. The functions of the calculator 23 and the controller 24 can be performed by the data processing unit 6 of the system shown in FIG. 3.

Figure 5:
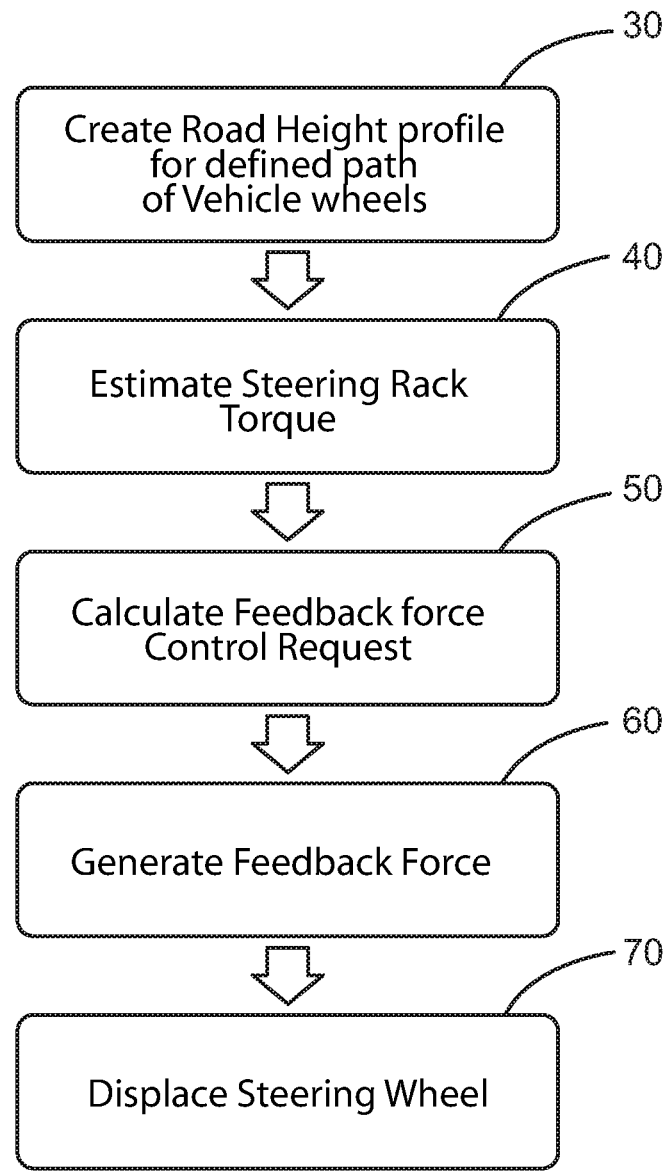
FIG. 5 it is a flow chart of one exemplary embodiment of a method of the invention.

FIG. 5 shows a flow chart of one exemplary embodiment of a method according to the invention for controlling or regulating an EPAS steering system of a vehicle.

In step 30, two different image files of a surface condition of a surface section lying ahead of the vehicle, in the direction of vehicle travel and subsequently driven on by the vehicle, are simultaneously captured. A single image file having depth information is created based on the two image files. Using the individual image file a height profile of the surface section is created for a defined vehicle front wheel path.

In step 40, steering rack load torques are estimated that likely act on a steering tie rod of the steer-by-wire steering system upon traveling over the anticipatorily detected surface section.

Forces, in particular damping counteracting forces, generated by the actuator 25 of the EPAS steering system, are calculated in step 50 with consideration for the load torques in estimating step 40. In addition, based on detected driving-state parameters, it is possible to determine the points in time when the forces should be generated by the actuator 25 or which feedback forces should be influenced, to develop a more pleasant driving response and to synchronize the generation of the forces with the surface condition of the surface section presently driven on.

In step 60, the actuator of the EPAS steering system is controlled by the control signals established at previously determined points in time, to influence feedback forces in real time.

In step 70, the steering wheel is displaced by the influenced feedback forces.

The feedback forces are influenced with consideration for an anticipatorily detected surface condition of a surface section lying ahead of the vehicle, in the direction of vehicle travel, and subsequently driven on by the vehicle. A warning signal or steering-assist force can be generated by the actuator based on or considering the surface condition. For example, a warning signal can be generated when a local height gradient of the height profile exceeds a predefined limit value.

The steering system 1 is mechanically coupled to the wheels and includes at least one actuator for applying a force or torque to the steering system, wherein the force or torque can be superimposed on a force or torque originating from the wheels. Steering systems of this type are referred to as EPAS steering systems. The system includes at least one detection unit 4 disposed on the vehicle 2 and configured for anticipatorily detecting at least one surface condition of a surface section 5 of the underlying surface 3 located ahead of the vehicle, in the direction of vehicle travel and subsequently driven on by the vehicle. In addition, the system includes at least one data processing unit 6 disposed on the vehicle 2. The data processing unit 6 connected to and communicating with the detection unit 4 and configured for generating control signals for controlling an actuator 25 of the steering system based on and considering the surface condition 20.

Steering assistance by the EPAS steering system can take place using an anticipatorily detected surface condition of an underlying surface section located ahead of the vehicle, in the direction of vehicle travel and subsequently driven on by the vehicle. Therefore, a conventional steering assistance not only takes place depending on an instantaneous steering angle of a steering wheel of the vehicle, effectuated by a driver of the vehicle, or depending on instantaneous dynamics of the steering wheel, effectuated by the driver, a steering assistance additionally takes place based on the surface conditions of a surface section located ahead of the vehicle, in the direction of vehicle travel and subsequently driven on by the vehicle. As a result, an EPAS steering system is provided with new functions, which allows for an improved control or regulation of an EPAS steering system of a vehicle.

Feedback forces from the wheels, for example, acting mechanically on the steering wheel and providing the driver with feedback on the surface conditions of a surface section presently driven on are influenced by the system. If costly sensors were to be disposed on the vehicle for this purpose, wherein load forces—that act instantaneously, for example, on a steering tie rod of the steering system—are detected when the front wheels of the vehicle, which can be steered with the steering system, come in contact with surface deviations of an surface section presently being driven on, the time required for processing the sensor data and subsequent reaction limitations due to hardware would result in a time delay between the detection of the surface condition and the generation of control signals influencing the feedback forces. This time delay and the additional reaction time by the driver would adversely affect the steering response, perceived by the driver, and a vehicle response.

In contrast thereto, in the exemplary embodiment, information regarding the surface condition can be processed before the vehicle drives on the particular surface section located ahead of the vehicle in the direction of vehicle travel. Because processing of the information regarding a surface section located further ahead has already taken place before the vehicle travels over the surface section, the above-described time delay does not occur. Instead, the feedback forces can be generated in real time; i.e., synchronously with the actual surface condition of the surface presently driven on. The system also generates early feedback forces; i.e., wherein the feedback forces are communicated to the driver in advance, considering the reaction time by the driver, before the vehicle drives on the surface section located ahead of the vehicle, in the direction of vehicle travel. As a result, the steering response perceived by the driver and the vehicle response are not adversely affected by a time delay, providing an improved or more realistic driving response. In addition, no additional costly sensors for detecting load forces are required.

Instantaneous driving-state parameters of the vehicle, for example, the instantaneous speed, detected by conventionally available or additional vehicle sensors, are preferably fed to the data processing unit. The data processing unit is preferably configured for determining the point in time at which, for example, an influencing or generation of feedback forces on the steering wheel should take place, with consideration for the instantaneous driving-state parameters, the anticipatorily detected surface condition of the subsequent surface section, and distance information related to the distance between the surface section and the steerable front wheels. Feedback forces generated as a result can also be synchronized with the surface condition of the underlying surface presently driven on.

The data processing unit can be formed by an available vehicle electronics system or be separate therefrom. The data processing unit is connected to the detection unit and, preferably, also to additional vehicle sensors for the purpose of communication, capable of receiving signals from these electrical components. Such a communication connection can be designed to be at least partially wired or wireless. In addition, the data processing unit can be connected indirectly or directly to the actuator of the EPAS steering system to communicate with and control the actuator through control signals. A load acting on the steering tie rod of the EPAS steering system can be estimated, by the data processing unit, based on the detected surface condition and can be utilized for deriving corresponding torque values or control signals corresponding thereto.

The detection unit can be configured for generating at least one image file of the particular detected surface condition or the surface section to anticipatorily detect the surface condition of the surface section lying ahead. The data processing unit configured for receiving the particular image file generated by the detection unit and, based on the image file, generating control signals for controlling the actuator of the EPAS steering system. The term "image file" is considered to mean both an optically detected image and an ultrasonic image or a radar image or other image detection mechanisms.

The detection unit can be configured for anticipatorily optically detecting the surface condition of the surface section subsequently driven on by the vehicle. Alternatively, the detection unit can be configured for anticipatorily detecting the surface condition of the surface section, subsequently driven on by the vehicle, based on a position-finding method. The system may also include two or more corresponding detection units.

The system may include a human-machine interface unit disposed on the vehicle and connected to the data processing unit to communicate and adjust at least one property or control parameter of the actuator. As a result, a driver of the vehicle can individually adjust the perceived steering response. Actuation of the human-machine interface unit operates the data processing unit whereby the data processing unit generates control signals to control the actuator depending on the particular actuation of the human-machine interface unit. For example, the data processing unit can be configured to generate control signals such that the feedback forces on the steering wheel are generated or influenced to a variably, adjustable extent.

The data processing device is configured for controlling the actuator wherein such that feedback forces from the wheels, acting mechanically on the steering wheel of the EPAS steering system, can be damped. By weakening the feedback forces, compared to feedback forces of a conventional mechanical steering system, the driver is provided with a smoother and therefore, more comfortable driving response. A driver using the human machine interface unit may adjust the extent or amount of feedback force damping. In addition, information from sensors disposed on the vehicle can be considered in determining the feedback force damping on the steering wheel.

In addition, the data processing unit may generate a warning signal based on the detected surface condition. The data processing unit configured, for example, to generate a warning signal when a local height gradient of the surface section, which has been derived from the anticipatorily detected surface condition, exceeds a predefined limit value. As a result, the driver of the vehicle can be prewarned, to avoid being surprised by subsequently traveling over a greater, for example, abrupt height difference of the surface section, possibly due to an obstacle lying on the surface section, improving the driving comfort of the vehicle. The warning signal perceptible by the driver optically, acoustically, or haptically. The warning signal can be made perceptible by the driver, for example, via a vibration of the steering wheel, generated by a corresponding control of the actuator of the EPAS steering system, via a vibration of the driver's seat or the like, or via the human-machine interface unit.

The data processing unit is also configured for determining—with consideration for the surface condition—a lane of the surface section for the vehicle, and to control the actuator—with consideration for the detected surface condition—so the actuator generates steering-assisting forces for staying in the lane. In the case of an uneven or laterally slanted lane or of a vehicle irregularity, counter-steering by the driver can be assisted in an amount necessary to stay in a lane for example, unequal tire pressures or the like. In addition, the data processing unit can be configured for determining—based on the anticipatorily detected surface condition of the surface section—ruts present in the surface section, and to control the actuator so the actuator generates steering-assisting forces for staying in the lane, wherein the steering-assisting forces result in a decrease or an increase in the steering force applied overall, depending on the direction of the force.

Additionally, the data processing unit may be configured to determine local coefficients of friction of the surface section based on the detected surface condition and to control the actuator depending on the coefficient of friction. In the presence of a p-split condition, for example, in which the coefficient of friction p differs between the left wheel path and the right wheel path, in the direction of vehicle travel, corrective measures can be initiated promptly to make it easier for the driver to keep the vehicle under control, for example, during a braking procedure. The data processing unit need not wait for a signal from a brake module, indicating a p-split condition. Therefore, the data processing unit makes it possible to begin vehicle-stabilizing via control of the actuator of the EPAS steering system substantially earlier. The data processing unit may also determine fluctuating friction-value conditions of a surface section based on the anticipatorily detected surface condition of the surface section and control the actuator of the EPAS steering system in such a way that an understeering and/or oversteering behavior of the vehicle is positively influenced.

The detection unit includes at least one camera or at least one LiDAR system. The camera can be a mono-camera or a stereo-camera. The camera can be disposed on an inner side of a windshield of the vehicle or in the area of a radiator grill of the vehicle. Aided by individual images of the surface condition of the surface section, for example images captured by the mono-camera, an estimation of the height profile can take place by the data processing unit via a comparison of individual images over time. Aided by the stereo-camera, different image files of the surface profile of the surface section can be simultaneously generated, wherein the data processing unit can be configured to create an individual image file having depth information based on the image files. The data processing unit is configured for image processing. In particular, different images of the subsequently traveled surface section can be captured perspectively by the stereo-camera. These images are transmitted in the form of image files as signals to the data processing unit, wherein the data processing unit combines the image files to generate a single image file having depth information for the subsequently traveled surface section. The LiDAR system creates an image file having depth information for the surface condition of the subsequently traveled surface section. The depth information, in the form of a depth matrix, utilized for estimating the height of the surface section in certain surface regions in the particular image file. By grouping all average points of the particular image file, a relative height profile vector for the surface section can be generated. The surface condition of the surface section, reconstructed in this way, can include a predictable path of the steerable front wheels. The distance between the front wheels and the particular point of the surface section provided by optical detection of the surface condition of the surface section with the particular camera or the LiDAR system and the subsequent processing of the image files with the data processing unit.

The data processing unit configured to create a height profile of the surface section for a defined path of the front wheels of the vehicle over the surface section. The path of the front wheels over the surface section can be derived, for example, from a detected road marking of the surface section or a detected steer angle of the front wheels. Detection means or additional vehicle sensors can be utilized for this purpose. The height profile can be converted at a later time, after having been corrected, if necessary, into real wheel load inputs which can then be considered to estimate the load forces and to generate or influence the feedback forces.

The data processing unit configured to generate a warning signal when a local height gradient of the height profile exceeds a predefined limit value. The driver of the vehicle can be prewarned, to avoid his being surprised by subsequently traveling over a greater, for example, abrupt height difference of the surface section, thereby improving driving comfort of the vehicle.

The vehicle includes a steering system mechanically coupled to the wheels and an actuator applying a force or torque to the steering system. The force or torque superimposed on a force or torque originating from the wheels. The vehicle can be a motor vehicle, in particular a passenger car or a truck. The actuator of the EPAS steering system can engage, for example, a steering train, a steering-gear pinion, or a rack of the EPAS steering system.

The system controls or regulates an EPAS steering system of a vehicle, wherein the steering system is mechanically coupled to the wheels and an actuator applies a force or a torque to the steering system, includes superimposing a force or torque on a force or torque originating from the wheels. Wherein the actuator of the EPAS steering system is controlled based on at least one anticipatorily optically detected surface condition of a surface section lying ahead of the vehicle in the direction of vehicle travel and subsequently driven on by the vehicle.

As disclosed, in one exemplary embodiment, at least one control property of the actuator is adjusted by a human-machine interface unit disposed on the vehicle.

According to a further embodiment, control of the actuator takes place wherein feedback forces from the wheels, acting mechanically on the steering wheel of the EPAS steering system, are damped by counteracting forces generated by the actuator.

According to an additional embodiment, a warning signal is generated based on a detected surface condition. A warning signal may also generate when the actuator generates steering-assisting forces for staying in the lane because a lane of the surface section for the vehicle is detected having a surface condition and the actuator generates a steering assist force.

An additional embodiment, determines local coefficients of friction of the surface section based on the detected surface condition wherein a local coefficient of friction is utilized for controlling the actuator.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle steering system comprising:
   an actuator applying a force to the steering system;
   a detection unit obtaining a surface condition of a surface section located ahead of a vehicle in a direction of vehicle travel and subsequently driven on by said vehicle; and
   a data processing unit connected to and communicating with the detection unit, said data processing unit generating a control signal for controlling the actuator based on the detected surface condition.

2. The system of claim 1 including a human-machine interface connected to and communicating with the data processing unit, said human-machine interface adjusting a control property of the actuator.

3. The system of claim 1 wherein the data processing unit is configured for controlling the actuator to damp feedback forces from a vehicle wheel acting mechanically on a steering wheel of the steering system.

4. The system of claim 1 wherein the data processing unit generates a warning signal based on the detected surface condition.

5. The system of claim 1 wherein the data processing unit determines a surface condition a lane of the surface section and sends a control signal to the actuator based on the surface condition whereby the actuator generates a steering-assist force to maintain lane control.

6. The system of claim 1 wherein the data processing unit determines a coefficient of friction of the surface section and controls the actuator based on the coefficient of friction.

7. The system of claim 1 wherein the detection unit includes at least a camera or a LiDAR system.

8. A vehicle steering system comprising:
   a steering mechanism mechanically coupled to a vehicle wheel;
   an actuator applying a force to the steering mechanism, said force superimposed on a force originating from the wheel;
   a detection unit obtaining a surface condition of a surface section located ahead of a vehicle; and
   a data processing unit communicating with the detection unit, said data processing unit generating a control signal for controlling the force superimposed by the actuator.

9. The vehicle steering system set forth in claim 8 including said control signal controlling the actuator to damp feedback forces from the wheel acting mechanically on a steering wheel of the steering system.

10. The vehicle steering system set forth in claim 8 when the data processing unit generates a warning signal based on the detected surface condition.

11. The vehicle steering system set forth in claim 8 wherein the detection unit includes a camera or LiDar system.

12. A method for steering system control comprising:
    providing an actuator for applying a force to the steering system, said force superimposed on a force originating from a vehicle wheel; and
    controlling said actuator based on an anticipatorily detected surface condition of a surface section located ahead of the vehicle in the direction of vehicle travel and subsequently driven on by the vehicle.

13. The method of claim 12 including a human-machine interface operative to adjust a control property the actuator.

14. The method of claim 13 wherein adjustment of the control property of the actuator generates a counteracting force by the actuator that damps feedback forces from the wheel that act mechanically on a steering wheel of the steering system.

15. The method of claim 12 including generating a warning signal based on the detected surface condition.

16. The method of claim 12 including detecting the surface section of a vehicle lane for the vehicle; and
    based on for the surface condition controlling the actuator such the actuator generates a steering assist force to maintain lane control.

17. The method of claim 12 including determining a local coefficient of friction of the surface section based on the detected surface condition; and
    controlling the actuator such that the actuator generates a steering assist force based on the coefficient of friction.

* * * * *